March 15, 1966 S. G. STALNECKER, JR., ET AL 3,240,601

ELECTROCONDUCTIVE COATING PATTERNING

Filed March 7, 1962

INVENTORS
STEWART G. STALNECKER JR.
AND PAUL R. THEOBALD

BY Clarence R. Patty, Jr.
ATTORNEY

United States Patent Office 3,240,601
Patented Mar. 15, 1966

3,240,601
ELECTROCONDUCTIVE COATING PATTERNING

Stewart G. Stalnecker, Jr., and Paul R. Theobald, Bradford, Pa., assignors to Corning Glass Works, Corning, N.Y., a corporation of New York Filed Mar. 7, 1962, Ser. No. 178,150
3 Claims. (Cl. 96—35)

This invention relates to a method for forming electroconductive patterns on substantially nonconductive substrates and more particularly to a method of forming thin wafer resistors, but is in no way limited to such applications.

Resistors, heaters, conductors, printed circuits and the like are formed of patterned resistive or electroconductive coatings applied to nonconductive substrates such as glass, ceramics, plastics and the like. In applications where electroconductive coatings are applied by evaporating, fuming or other hot processes, it is difficult to apply patterned coatings directly, therefore, continuous coatings are applied which are thereafter patterned. One such method entails placing a separately formed, unattached mask over the continuous coating, said mask having the desired pattern and then sandblasting the electroconductive coating off of the substrate around said mask. It has been found that such a mask is difficult to make accurately and is difficult to hold in place. Since it is merely held in place some undercutting of the coating takes place causing the resulting pattern to have uneven edges thereby affecting its electrical properties. In addition, such masks can only be used for a few pieces and thereafter become damaged by the repeated sandblasting.

Other methods such as etching, electric burning and the like have been used, but have been found unsatisfactory where the object is small, the substrate surface is not smooth, and the pattern lines are thin and require good definition.

Furthermore, it has been found difficult to economically produce small objects having patterned electroconductive coatings where the pattern line width or the spacing between such lines is about 0.001″.

It is the specific object of this invention to provide a method for forming patterned electroconductive coatings on surfaces of vitreous or other nonconductive materials where the above disadvantages are overcome.

It is another object of this invention to provide an improved method for forming patterned electroconductive coatings where the pattern lines are very thin.

A further object is to provide a method for forming a patterned electroconductive coating which has smooth pattern line edges.

Still another object is to provide an economical method for removing unwanted portions of an electroconductive coating through sandblasting.

A still further object is to provide an improved sandblasting mask.

Still another object is to provide an improved method for sandblasting where the sandblasting mask is adhered to the surface being treated.

A still further object is to provide a method for forming patterned coatings or decorative patterns on a substrate.

Additional objects, features, and advantages of the present invention will become apparent, to those skilled in the art, from the following detailed description and the attached drawing, on which, by way of example, only the preferred embodiments of this invention are illustrated.

I have found that such objects can be achieved by forming a continuous electroconductive coating upon a suitable nonconductive substrate, applying a layer of resilient photosensitive material to said coating, disposing upon said layer an element, such as a photographic negative or the like, having a light transmitting first area corresponding in shape to the desired pattern of said electroconductive coating and a substantially opaque second area surrounding said first area, illuminating the assembly so formed with a suitable light thereby exposing an area of said photosensitive material corresponding to said first area while leaving the remainder of said photosensitive material substantially unexposed, removing said element, removing the photosensitive material from the photographically unexposed areas thereby uncovering a portion of the electroconductive coating, removing the thus uncovered electroconductive coating by sandblasting the surface, the photographically exposed resilient photosensitive material preventing the removal of that portion of the electroconductive coating which is covered by it, and thereafter removing the photographically exposed photosensitive material.

Figure 1:
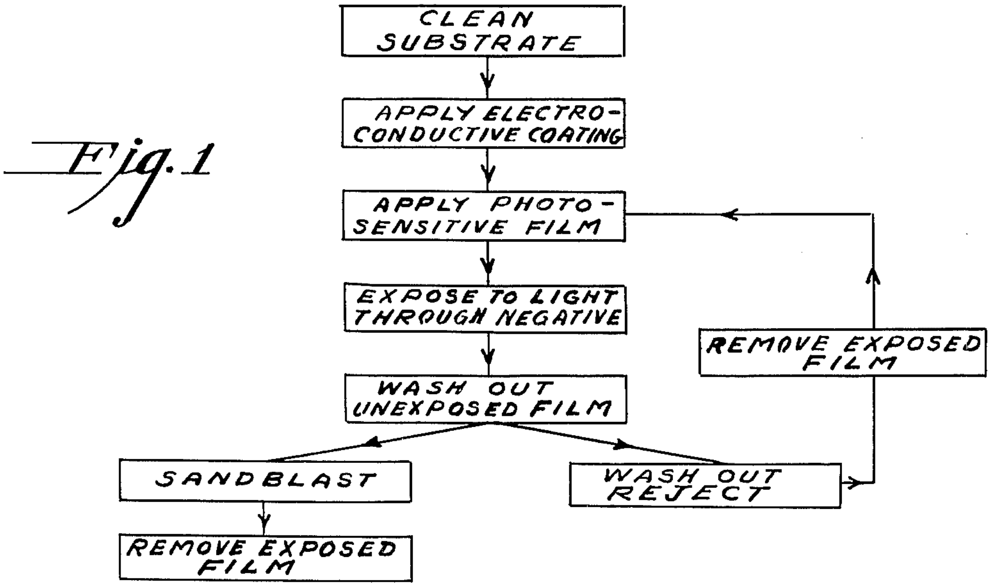
FIG. 1 is a flow diagram illustrating the steps of the method of this invention.
Figure 2:
FIGS. 2–6 are diagrammatic views illustrating the various steps of one embodiment of this invention.
Figure 3:
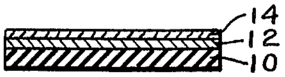
Figure 4:
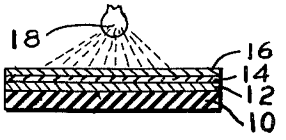
Figure 5:
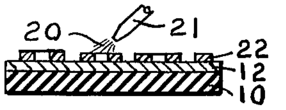
Figure 6:
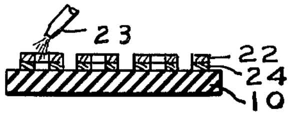
Figure 7:
FIG. 7 is a cross section of a thin wafer resistor having a patterned resistance element formed on one flat surface of the substrate thereof in accordance with this invention.

Any electroconductive coating material, which can be applied in thin films or coating is suitable for the present purpose. Such films or coatings are generally composed of metallic and/or metallic oxide compositions and may have various fillers, binders and the like. For one example of a suitable film, its characteristics and method of application, reference is made to U.S. Patent No. 2,564,706 issued to John M. Mochel and assigned to the same assignee as the instant application.

FIGS. 2–7 illustrate the various steps of the method and the resulting product of this invention. In accordance with this invention a nonconductive substrate 10, is cleaned by any suitable commercial cleaning method such as dipping in an ultrasonically agitated bath of acetone, xylene, trichlorethylene or the like. Suitable substrate materials are glass, ceramics, plastics and the like. A continuous coating 12, of an electroconductive material is thereafter applied to said substrate. The substrate and the electroconductive coating materials, the method of cleaning the substrate and the method of applying the electroconductive coating are not critical elements of this invention.

A continuous layer 14, of a resilient photosensitive material is then applied over the coating 12 and is thereafter suitably dried. A photographic negative 16, or the like having a pattern thereon of substantially the same configuration as that desired for the pattern of the electroconductive coating, is disposed adjacent said layer 14, and the assembly so formed is exposed to a light source 18, of a type and intensity required by the particular photosensitive material employed. The photographic negative is then removed and that portion of the photosensitive material which was not exposed to said light source 18, is removed by suitable means, such as, for example, a stream of water 20, supplied by suitable means 21, thereby uncovering that portion of the electroconductive coating which is to be removed, while leaving the exposed photosensitive material 22, having the desired pattern, adhered to said electroconductive coating 12. The unit so formed is then sandblasted, through the use of suitable sandblasting means 23, to remove the said uncovered portion of the electroconductive coating. The remainder of said electroconductive coating, forming the patterned electroconductive coating 24, is protected during the sandblasting step by the photographically exposed resilient photosensitive material 22. After the sandblasting step, the exposed photosensitive material 22, is removed by suitable means, leaving the patterned electroconductive coating 24, firmly adhered to said substrate 10.

Figure 8:
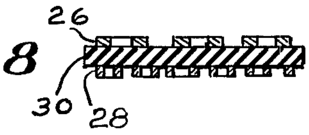
FIG. 8 is a cross section of a thin wafer resistance device having a patterned resistance element formed on each flat surface of the substrate thereof in accordance with this invention.

FIG. 8 illustrates another embodiment of this invention where two patterned electroconductive coatings 26, and 28, are formed on a nonconductive substrate 30, one on each flat surface thereof, by duplicating the method hereinabove described either concurrently or successively.

Figure 9:
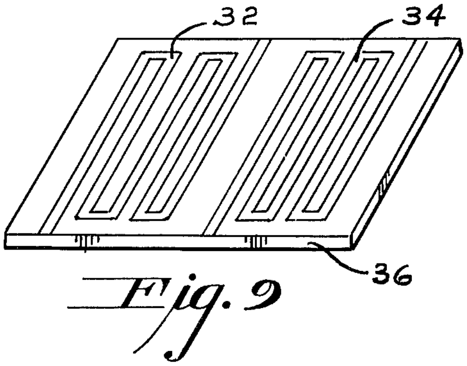
FIG. 9 is an oblique view of a thin wafer resistance device having two resistance elements formed on one flat surface of the substrate thereof in accordance with this invention.

FIG. 9 illustrates still another embodiment of this invention where two patterned electroconductive coatings 32 and 34, are formed on one surface of a nonconductive substrate 36, in accordance with the method hereinabove described, employing a negative or the like having a suitable patterned configuration and arrangement thereon.

It can be readily seen that any number of patterns of any configuration and arrangement may be formed on one or both flat surfaces of a substrate in accordance with this invention.

Resilient photosensitive materials suitable for the present purposes are prepared by mixing photosensitive compounds such as potassium bichromate, ammonium bichromate and the like with resinous materials such as polyvinyl alcohol, polyvinyl acetate and the like. A particularly suitable material is prepared by mixing 1 part potassium bichromate with 16 parts polyvinyl alcohol by volume although suitable materials may be prepared by mixing ½ to 8 parts potassium bichromate with 16 parts polyvinyl alcohol by volume. It is important that such materials be resilient so that they may absorb the bombardment by the sandblast particles without being removed, and that such materials do not react or combine with or otherwise deleteriously affect the coating to be patterned. They must be soluble before being photographically exposed and insoluble after.

It should be noted that by employing the method of this invention it is possible to approach a 100 percent yield, since each component may be easily inspected after the unexposed photosensitive material is washed out and reprocessed if the remaining photosensitive material is found to be defective in any way.

A typical example of one method of carrying out the present invention is illustrated by the following description. A 5/16" square wafer of hot pressed alumina, having a thickness of about 0.010" was suitably cleaned by dipping in an ultrasonically agitated acetone bath and a continuous electroconductive coating was applied to each of its flat surfaces. This coating was of the type described in the heretofore noted Mochel patent.

A layer of photosensitive material comprising said preferred mixture of polyvinyl alcohol and potassium bichromate, was applied over each electroconductive coating and was allowed to air dry to a dull finish. Then a photographic negative having a desired pattern thereon, was placed over one layer of said photosensitive material. Another photographic negative was placed over the other layer of photosensitive material and the assembly was exposed to ultraviolet light for 3½ minutes, using a mercury vapor lamp. Immediately after this exposure the negatives were removed and the photographically unexposed photosensitive material was washed out by means of a warm water spray. After this washout only that portion of the electroconductive coating which formed the desired patterns was covered with photographically exposed photosensitive material, while the balance was uncovered. A jet of aluminum oxide powder, having an approximate particle size of about 27 microns, was then directed to both flat surfaces of the unit. All of the uncovered electroconductive coating was thereby removed with the photographically exposed photosensitive material being a mask for the balance. The photosensitive material mask was then removed by washing with a dilute solution of about 30 percent hydrogen peroxide. The thin wafer resistor so formed had pattern lines of about 0.002" wide, which lines had smooth edges.

It was found that pattern lines having a width of 0.001" or less could readily be formed on a comparatively smooth substrate surface if the sandblasting medium particle size was commensurately reduced.

It is obvious that the method of this invention may be readily employed for patterning any type of film not necessarily electroconductive, as well as multiple films or even the substrate itself. For example, a series of condensers may be formed by suitably masking a plurality of alternating layers of conductive and nonconductive films. A decorative or the like pattern may be formed on the substrate itself by, for example, sandblasting the substrate around a mask formed by the method of this invention.

Although the present invention has been described with respect to specific details of certain embodiments thereof, it is not intended that such details be limitations upon the scope of the invention except insofar as set forth in the following claims.

What is claimed is:

1. A method of making an electrical resistance device having a patterned film resistance element on a dielectric substrate comprising the steps of (a) providing a flat dielectric substrate,
(b) applying a continuous adherent irridized metallic oxide film directly to at least one surface of said substrate,
(c) applying a layer of a mixture of polyvinyl alcohol and potassium bichromate to said film,
(d) drying said layer,
(e) disposing a member adjacent said layer, said member having a light transmitting first area corresponding in shape to the desired resistance element configuration and arrangement and a substantially opaque second area surrounding said first area,
(f) illuminating the assembly so formed with an ultraviolet light for approximately 3½ minutes, thereby exposing an area of said layer corresponding in shape to said first area while leaving the remainder of said layer substantially unexposed,
(g) removing the said member,
(h) directing a water spray to said layer thereby washing out said substantially unexposed portion of said layer and uncovering a portion of said film corresponding in shape to said second area,
(i) directing a sandblast stream to the unit so formed thereby removing the uncovered portion of said film, and thereafter
(j) washing said unit in a solution of approximately 30 percent by weight of hydrogen peroxide.

2. A method of making an electrical resistance device having a patterned film resistance element on a dielectric substrate comprising the steps of (a) providing a flat dielectric substrate,
(b) applying a continuous adherent metallic oxide film directly to at least one surface of said substrate,
(c) applying to said film a substantially continuous layer of a material consisting essentially of ½ to 8 parts potassium bichromate and 16 parts polyvinyl alcohol by volume,
(d) drying said layer,
(e) disposing a member adjacent said layer, said member having a light transmitting first area corresponding in shape to the desired resistance element configuration and arrangement and substantially opaque second area surrounding first area, (f) illuminating the assembly so formed with a light to expose an area of said layer corresponding in shape to said first area while leaving the remainder of said layer substantially unexposed, (g) removing said member, (h) washing away said substantially unexposed portion of said layer thereby uncovering a portion of said film corresponding in shape to said second area, (i) directing a sandblast stream to the unit so formed to remove the uncovered portion of said film, and thereafter (j) immersing said unit in a solution of hydrogen peroxide to remove said exposed portion of said layer.

3. A method of making a patterned coating on a substantially flat substrate comprising the steps of (a) applying a substantially continuous adherent metallic oxide film to at least one surface of said substrate, (b) applying to said film a substantially continuous layer of a material consisting essentially of ½ to 8 parts potassium bichromate and 16 parts polyvinyl alcohol by volume, (c) disposing adjacent said layer an element having a light transmitting first area corresponding in shape to the desired pattern of said coating and a substantially opaque second area surrounding said first area, (d) illuminating the assembly so formed with an ultraviolet light thereby exposing an area of said layer corresponding in shape to said first area while leaving the remainder of said layer substantially unexposed, (e) removing said element, (f) washing away the substantially unexposed portion of said layer thereby uncovering a portion of said film corresponding in shape to said second area, (g) directing a sandblast stream to the unit so formed to remove the thus uncovered portion of said film, and thereafter, (h) washing said unit in a solution of hydrogen peroxide to remove the exposed portion of said layer.

References Cited by the Examiner

UNITED STATES PATENTS

| | | | |
|---|---|---|---|
| 2,544,905 | 3/1951 | Van Deusen | 96—36 |
| 2,564,706 | 8/1951 | Mochel | 106—286 |
| 2,830,899 | 4/1958 | Brown | 96—36 |
| 2,854,366 | 9/1958 | Wannlund et al. | 156—17 |
| 2,935,781 | 5/1960 | Heidenreich | 156—17 |
| 2,968,555 | 1/1961 | Bender et al. | 96—3 |
| 2,996,380 | 8/1961 | Evans | 96—35 |
| 3,075,892 | 1/1963 | John et al. | 117—200 |
| 3,095,340 | 6/1963 | Triller | 156—17 |
| 3,122,817 | 3/1964 | Andrus | 96—36 |

OTHER REFERENCES

Eisler: The Technology of Printed Circuits, Heywood & Co., Ltd., London, 1959, pp. 28–41 and 96–110.

Kodak Industrial Data Book (p. 7) Kodak Photosensitive Resists For Industry, 1962, page 44.

Swiggete: Intro. to Printed Circuits, 1956, John F. Rider Publ. Inc., New York, pp. 18–54.

NORMAN G. TORCHIN, *Primary Examiner.*

ABRAHAM H. WINKELSTEIN, *Examiner.*